(12) United States Patent
Cha et al.

(10) Patent No.: US 6,458,938 B1
(45) Date of Patent: Oct. 1, 2002

(54) CHITOSAN DERIVATIVES COMBINED WITH POLYPROPYLENE GLYCOL AND METHOD FOR PREPARING THE SAME

(75) Inventors: Jin Ki Cha, Suwon (KR); Byung Ki Jo, Anyang (KR); Byung Jo Ha, Kunpo (KR)

(73) Assignee: Coreana Cosmetics Co., Ltd., Seoul (KR)

( * ) Notice: Subject to any disclaimer, the term of this patent is extended or adjusted under 35 U.S.C. 154(b) by 70 days.

(21) Appl. No.: 09/758,134

(22) Filed: Jan. 12, 2001

(51) Int. Cl.$^7$ .............................................. C08B 37/08
(52) U.S. Cl. ...................................................... 536/20
(58) Field of Search ........................................... 536/20

(56) References Cited

U.S. PATENT DOCUMENTS 6,090,928 A * 7/2000 Donges et al. ................ 536/20

* cited by examiner

*Primary Examiner*—Peter O'Sullivan
(74) *Attorney, Agent, or Firm*—Jacobson Holman, PLLC

(57) ABSTRACT

Disclosed are chitosan derivatives and a preparation method thereof, in which a chitosan is combined with a polypropylene glycol that provides a required solubility in water and high compatibility with other compounds. The chitosan derivatives represented by the formula I are prepared by grafting the polypropylene glycol on the amino group or hydroxyl group of the chitosan or a partially deacetylated chitosan by nucleophilic substitution:

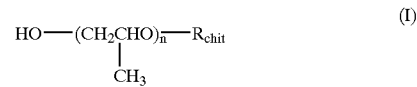

wherein $R_{chit}$ represents a chitosan or a partially deacetylated chitosan; and n is an integer.

9 Claims, 1 Drawing Sheet

CHITOSAN DERIVATIVES COMBINED WITH POLYPROPYLENE GLYCOL AND METHOD FOR PREPARING THE SAME

BACKGROUND OF THE INVENTION

1. Field of the Invention

The present invention relates to chitosan derivatives and a method for preparing the same, in which a chitosan is combined with a polypropylene glycol.

2. Description of the Related Art

Chitosan is a basic polysaccharide, with a molecular weight of about 800,000 to 1,000,000, which is composed of D-glucosamine residues and N-acetyl-D-glucosamine residues and has beta-(1,4)-linked 2-amido-2-deoxy-D-glucose units.

Chitosan is obtained from deacetylated chitin contained in the skins of crabs (from Japan, U.S.A.), Krill (from Poland), shrimps (from India).

Now, a description will be given in detail as to a process for extracting chitosan from the skin of crabs by way of example.

First, the skin of crabs, which contains chitin (25–30%), calcium carbonate (40–50%) and proteins (20–30%) as principal gradients, is treated with a diluted hydrochloric acid or a diluted sodium hydroxide to remove calcium carbonate and proteins, respectively.

The chitin thus obtained is then deacetylated with a concentrated sodium hydroxide to yield a chitosan. The chitosan may have a desired degree of deacetylation depending on the reaction conditions. For example, the chitosan commercially available as a coagulator has a degree of deacetylation in the range from about 70 to 80%.

The chitosan plays an important role in a living body. For example, the chitosan mechanically supports cells in the tissue of the body and becomes a principal component of the extracellular medium to form the outer skeleton.

Also, the chitosan is a promising natural resource for beauty articles and currently studied in regard to its availability in various applications such as foods and medicinal substances.

Recently, chitin or chitosan is growingly prevailing as the use has been made of the hydrolysis products of chitin or chitosan, including lower monosaccharides (e.g., D-glucosamine and N-acetyl D-glucosamine) or oligosaccharides (e.g., chitin oligosaccharide and chitosan oligosaccharide).

However, the studies of the chitosan have been chiefly concentrated on the applications including film former, thickener, antibiotic, etc. and there have been no report on the chitosan derivatives used for stabilizer and moisturizer in cosmetics.

Such a limitation in the use results from the fact that the chitosan is insoluble in almost solvents and thus difficult to be used as a solution and that the chitosan may be slightly soluble in a diluted acid of similar properties but is insoluble in water or alcohol. Another reason for such a limitation in the cosmetic use is that the chitosan is almost incompatible with various effective gradients of the cosmetics such as plant extracts, proteins and derivatives thereof.

To overcome these problems, an attempt has been made to combine a hydrophobic fatty acid with the amino group or hydroxyl group of the chitosan, in which case the resulting chitosan has a low solubility in water and is not useful as a material for cosmetics.

Alternatively, an aqueous chitosan containing 1 or 2 moles of ethylene oxide added to the chitosan in order to make the chitosan more soluble in water has an excessively high solubility in water and forms a complex with natural extracts used in the cosmetics, which results in a long-term deterioration of the efficacy and effect of the cosmetics. Furthermore, the ethylene oxide is a toxic gas at the ambient temperature and causes some difficulties in the preparation of the cosmetics.

SUMMARY OF THE INVENTION

It is, therefore, an object of the present invention to solve the problems and to provide chitosan derivatives represented by the formula I, in which a chitosan is combined with a polypropylene glycol in order to make the chitosan have a required solubility and be compatible with other compounds of cosmetics.

It is another object of the present invention to provide a method for preparing the chitosan derivatives represented by the formula I.

It is further another object of the present invention to provide skin/hair cosmetics containing as an effective gradient the chitosan derivatives represented by the formula I.

To achieve the above objects of the present invention, there is provided chitosan derivatives combined with polypropylene glycol and a method for preparing the same, characterized in that the polypropylene glycol is grafted on the amino group or hydroxyl group of a chitosan or a partially deacetylated chitosan by nucleophilic substitution.

DETAILED DESCRIPTION OF THE PREFERRED EMBODIMENT

Figure 1:
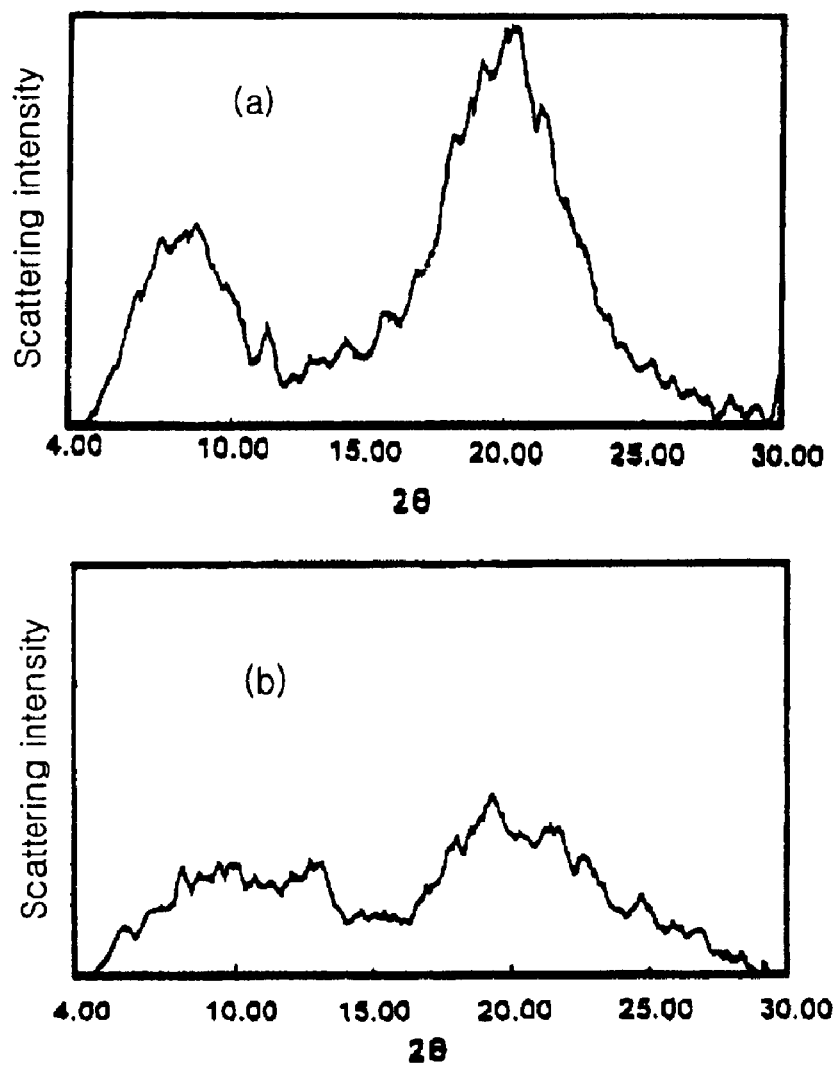
FIG. 1 shows the comparison of crystallinity between polypropylene glycol chitosan and partially deacetylated chitosan.

The present invention is directed to chitosan derivatives combined with polypropylene glycol and a method for preparing the same, which will be described in detail as follows.

The chitosan derivatives combined with polypropylene according to the present invention have a molecular weight of 500,000 to 5,000,000 and are represented by the formula I, in which a polypropylene glycol is combined with an amino group or a hydroxyl group of chitosan or partially deacetylated chitosan:

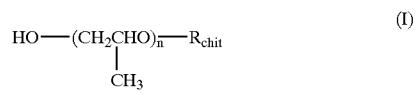

In the formula, $R_{chit}$ is a chitosan or a partially deacetylated chitosan; and n is an integer.

$R_{chit}$ represents a chitosan or a partially deacetylated chitosan that has a molecular weight of 100,000 to 1,000,000 and a deacetylation degree of 5 to 95%, preferably 70 to 95%. The molecular represented by the formula I has a polymerization degree of the polypropylene glycol in the range from 10 to 100.

The polymerization degree of the polypropylene glycol indicates the percentage (%) of the amino groups or hydroxyl groups combined with the polypropylene glycol. That is, the polymerization degree of the polypropylene glycol being in the range from 10 to 100 means that all or some of the amino groups or hydroxyl groups of the chain are substituted.

The chitosan derivatives combined with polypropylene glycol according to the present invention are prepared by reacting a liquid propylene oxide with the amino group or hydroxyl group of a chitosan or a partially deacetylated chitosan by nucleophilic substitution to graft the polypropylene glycol.

In order to make the chitosan derivatives properly water-soluble, the degree of polypropylene glycol grafting can be controlled depending on the property peculiar to the field of the application.

For example, in the cosmetic applications, the degree of polypropylene glycol grafting is controlled to provide a solubility in water in the range from about 1 to 100 mg/ml, which is determined by the degree of hydrophilicity or lipophilicity desired on a certain tissue of the skin.

Generally, as the chitosan is entirely combined with polypropylene glycol at an increased polymerization degree of the polypropylene glycol, the lipophilicity is increased and the water-solubility decreases. For that reason, the chitosan derivatives of the present invention have to be regulated in the degree of combination with polypropylene glycol.

The chitosan derivatives combined with polypropylene glycol according to the present invention thus obtained can be used as an emulsifying adjuvant in emulsion articles such as cream, lotion, etc. The chitosan derivatives also have a moisturizing effect and a film forming ability and are usable in cosmetic products that are designed to protect the hair or skin and provide a good gloss, including lotion, cream, toning lotion, essence, pack, hair remover, hair spray, hair mousse, hair gel, shampoo, conditioner, permanent waving agents, body cleanser, lipstick, etc.

Hereinafter, the present invention will be described in detail by way of the following examples and experimental examples, which are not intended to limit the scope of the present invention.

EXAMPLE

Preparation of Chitosan Derivatives Combined with Polypropylene Glycol.

Now, a description will be given below in detail as to a method for preparing chitosan derivatives combined with polypropylene glycol.

First, the skins of shrimps and crabs are treated with a diluted hydrochloric acid and a diluted sodium hydroxide to remove calcium carbonate and proteins, respectively. The chitin thus obtained is then deacetylated with a concentrated sodium hydroxide to yield chitosan.

The deacetylated chitosan, which has a molecular weight of 100,000 to 1,000,000, is measured in regard to the molecular weight by the gel permeation chromatography (GPC) under the following conditions.

Subsequently, a liquid propylene oxide is added to the deacetylated chitosan at a temperature of 50 to 80° C. under the pressure of 1 to 10 Kg/cm$^2$, preferably 4 to 8 Kg/cm$^2$. To the mixture is then added one or two strong alkaline catalysts such as sodium hydroxide, potassium hydroxide or lithium hydroxide. The reaction concerned is a nucleophilic substitution at the amine group and the (primary or secondary) hydroxyl group of the chitosan. The reactivity increases in the order of amine group, primary hydroxyl group and secondary hydroxyl group.

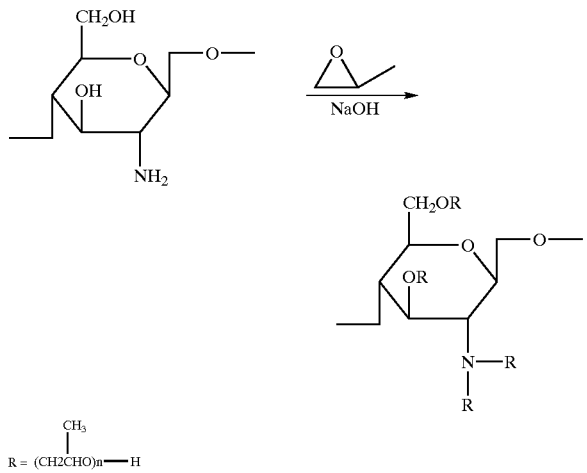

$R = (CH_2CHO)n\text{---}H$ wherein n is an integer.

** GPC Measurement Conditions

Model name: Waters LC Module, I, M410 R1 Ultrahydrogel 250, 1000, Linear Column, M2010 Millennium equipped with a heating chamber;

Test condition: Flow rate 1.0 ml/min;

Column temperature: 36° C.;

Mobile phase: 0.2M acetic acid/0.1M NaCl

Sample dose: 150 μl;

Sample processing: 0.2 w/v % solution is filtered with a 0.45-micron filter; and Standard: Pullulan.

Example 1

Chitin obtained from shrimps and crabs was deacetylated by 50% with concentrated sodium hydroxide to produce chitosan having a molecular weight of 500,000. The chitosan thus obtained was reacted with propylene oxide in the presence of sodium hydroxide at 70° C. and under the pressure of 4.5 Kg/cm$^2$ for 10 hours to yield the polypropylene glycol chitosan of the present invention.

Example 2

Chitin obtained from shrimps and crabs was deacetylated by 60% with concentrated sodium hydroxide to produce chitosan having a molecular weight of 500,000. The chitosan thus obtained was reacted with propylene oxide in the presence of potassium hydroxide at 75° C. and under the pressure of 4.3 Kg/cm$^2$ for 9 hours to yield the polypropylene glycol chitosan of the present invention.

Example 3

Chitin obtained from shrimps and crabs was deacetylated by 70% with concentrated sodium hydroxide to produce chitosan having a molecular weight of 600,000. The chitosan thus obtained was reacted with propylene oxide in the presence of lithium hydroxide at 70° C. and under the pressure of 4.0 Kg/cm$^2$ for 12 hours to yield the polypropylene glycol chitosan of the present invention.

Example 4

Chitin obtained from shrimps and crabs was deacetylated by 80% with concentrated sodium hydroxide to produce chitosan having a molecular weight of 500,000. The chitosan thus obtained was reacted with propylene oxide in the presence of sodium hydroxide at 75° C. and under the pressure of 4.8 Kg/cm² for 8 hours to yield the polypropylene glycol chitosan of the present invention.

Example 5

Chitin obtained from shrimps and crabs was deacetylated by 90% with concentrated sodium hydroxide to produce chitosan having a molecular weight of 700,000. The chitosan thus obtained was reacted with propylene oxide in the presence of potassium hydroxide at 80° C. and under the pressure of 4.0 Kg/cm² for 60 minutes to yield the polypropylene glycol chitosan of the present invention.

Example 6

Chitin obtained from shrimps and crabs was deacetylated by 100% with concentrated sodium hydroxide to produce chitosan having a molecular weight of 500,000. The chitosan thus obtained was reacted with propylene oxide in the presence of lithium hydroxide at 65° C. and under the pressure of 7 Kg/cm² for 6 hours to yield the polypropylene glycol chitosan of the present invention.

Example 7

Chitin obtained from shrimps and crabs was deacetylated by 80% with concentrated sodium hydroxide to produce chitosan having a molecular weight of 800,000. The chitosan thus obtained was reacted with propylene oxide in the presence of sodium hydroxide at 80° C. and under the pressure of 8 Kg/cm² for 4 hours to yield the polypropylene glycol chitosan of the present invention.

Example 8

Chitin obtained from shrimps and crabs was deacetylated by 80% with concentrated sodium hydroxide to produce chitosan having a molecular weight of 600,000. The chitosan thus obtained was reacted with propylene oxide in the presence of lithium hydroxide at 50° C. and under the pressure of 4 Kg/cm² for 6 hours to yield the polypropylene glycol chitosan of the present invention.

Example 9

Chitin obtained from shrimps and crabs was deacetylated by 95% with concentrated sodium hydroxide to produce chitosan having a molecular weight of 800,000. The chitosan thus obtained was reacted with propylene oxide in the presence of lithium hydroxide at 80° C. and under the pressure of 8 Kg/cm² for 24 hours to yield the polypropylene glycol chitosan of the present invention.

Experimental Example 1

Identification of Compound by FT-IR

The polypropylene glycol chitosans prepared according to the present invention were measured in regard to the cyclic frequency by the FT-IR method in order to identify the compounds. The results are presented in Table 1.

TABLE 1

| Wave number (cm⁻¹) | Peak |
| --- | --- |
| 2,900 | Aliphatic CH stretching |
| 1,375 | $CH^3$ deformation |
| 1,100 | C-O-C bending vibration |

It can be seen from the peaks at a specific region in Table 1 that the polypropylene glycol chitosan was synthesized.

Experimental Example 2

Comparison of Crystallity Measured by X-rays

The polypropylene glycol chitosan prepared according to the present invention and the starting material, i.e., partially deacetylated chitosan were measured in regard to the scattering intensity by the X-ray diffraction and compared with each other in the crystallinity in order to check the synthesis of the title compound. The results are presented in FIG. 1

As shown in FIG. 1, the polypropylene glycol chitosan of the present invention had a decrease in the scattering intensity relative to the partially acetylated chitosan, i.e., a reduction of the crystallinity. This demonstrated the synthesis of the polypropylene glycol chitosan.

Experimental Example 3

Measurement of Solubility

The polypropylene glycol chitosan prepared according to the present invention and the partially deacetylated chitosan were measured in regard to solubility in various solvents, including water, NaOH, DMF, DMSO, NMP, acetone, and isopropyl alcohol. The results are presented in Table 2.

TABLE 2

| Solvent | Polypropylene glycol chitosan | Chitosan |
| --- | --- | --- |
| Water | O | X |
| 1N NaOH | O | X |
| DMF | O | X |
| DMSO | O | X |
| NMP | O | X |
| Acetone | O | X |
| Isopropyl alcohol | O | X |

As shown in Table 2, the polypropylene glycol chitosan was superior in solubility in various organic solvents to the chitosan.

As described above, the chitosan derivatives combined with polypropylene glycol according to the present invention have a required solubility in water and compatibility with other compounds, thus providing easiness in handling. Consequently, the chitosan derivatives also provide a good gloss and a moisturizing effect for hairs and the skin and allow production of chitosan-containing cosmetics with enhanced product quality and reliability.

What is claimed is:
1. Chitosan derivatives combined with polypropylene glycol, the chitosan derivatives being represented by the formula I:

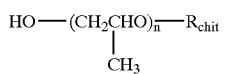 (I)

wherein $R_{chit}$ represents a chitosan or a partially deacetylated chitosan; and n is an integer.

2. The chitosan derivatives as claimed in claim 1, wherein $R_{chit}$ has a molecular weight of 100,000 to 1,000,000 and a deacetylation degree of 5 to 95%.

3. The chitosan derivatives as claimed in claim 2, wherein $R_{chit}$ has a deacetylation degree of 70 to 95%.

4. The chitosan derivatives as claimed in claim 1, wherein the polymerization degree of the polypropylene glycol is in the range from 10 to 100.

5. The chitosan derivatives as claimed in claim 1, wherein the chitosan derivatives combined with polypropylene glycol have a molecular weight of 500,000 to 5,000,000.

6. A method for preparing chitosan derivatives combined with polypropylene glycol, comprising the steps of:

(a) adding a diluted hydrochloric acid and a diluted sodium hydroxide to a chitinous feedstock to remove calcium carbonate and proteins, respectively, and obtain a chitosan;

(b) adding a concentrated sodium hydroxide to the chitosan to deacetylate the chitosan; and (c) reacting a liquid propylene oxide with the deacetylated chitosan in the presence of a strong alkaline catalyst at a high temperature under a pressure to graft the polypropylene glycol.

7. The method as claimed in claim 6, wherein the reaction pressure is 1 to 10 Kg/cm$^2$.

8. The method as claimed in claim 6, wherein the reaction temperature is 50 to 80° C.

9. The method as claimed in claim 6, wherein the strong alkaline catalyst is selected from the group consisting of sodium hydroxide, potassium hydroxide, lithium hydroxide, and mixtures thereof.

* * * * *